June 12, 1962 L. HOFMANN 3,038,685
LANDING GEAR FOR AIRCRAFT
Filed March 27, 1959 2 Sheets-Sheet 1
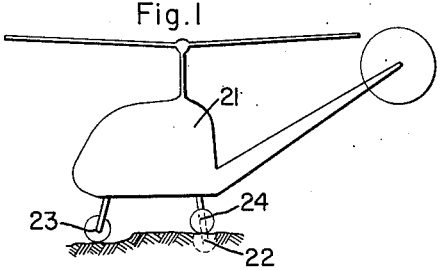
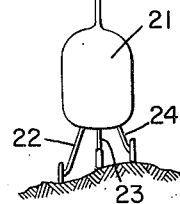
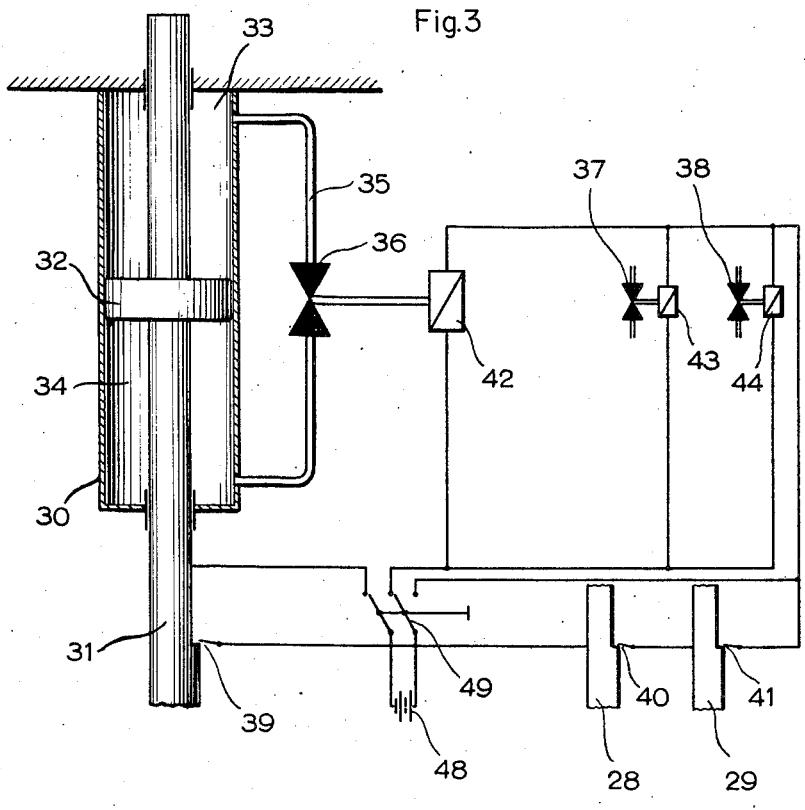
Inventor
Ludwig Hofmann
By Stevens Davis Miller & Mosher
Attorneys June 12, 1962 L. HOFMANN 3,038,685

LANDING GEAR FOR AIRCRAFT

Filed March 27, 1959 2 Sheets-Sheet 2

Inventor
Ludwig Hofmann
By Stevens Davis Miller & Mosher
Attorneys

United States Patent Office 3,038,685
Patented June 12, 1962

3,038,685
LANDING GEAR FOR AIRCRAFT
Ludwig Hofmann, Buhl, Baden, Germany, assignor to Bolkow-Entwicklungen KG, Ottobrunn, near Munich, Germany
Filed Mar. 27, 1959, Ser. No. 802,428
Claims priority, application Germany Apr. 5, 1958
1 Claim. (Cl. 244—17.17)

In aircraft which take off and land vertically, it is necessary for the thrust axis to remain vertical during all phases of the take-off and landing operation. This applies in particular to helicopters. Accordingly, the invention will be explained below with reference to a helicopter.

In the known constructions, the landing gear of helicopters is designed for take-off and landing on a horizontal surface. The fuselage of the helicopter is substantially horizontal during hovering flight and cannot be brought out of this position by any control manoeuvre without causing a movement forwards, backwards or sideways. When landing on an inclined plane, however, the whole helicopter with its rotor must be lowered out of the horizontal into a suitably inclined position. This may be effected by guiding the rotor against the slope of the ground from the first moment of contact between the landing gear and the ground so that the pitching moment as a result of the oblique position of the helicopter is compensated by a corresponding inclination of the rotor until landing is completed. The take-off from this position may be effected in the same manner. The opposing control can only be carried out effectively, however, so long as the ground is not more steeply inclined than the maximum possible angle of inclination of the rotor. This is generally between 6° and 8°. On more steeply inclined ground, such a landing can no longer be carried out, particularly with unfavourable wind conditions such as squally winds or winds blowing down the slope.

The range of application of the helicopter is considerably increased if it is given the opportunity of being able to take off and land safely on unprepared surfaces without regard to the nature of the ground. Only on this assumption does its use in the Mountain Rescue Service and its use for many military purposes acquire meaning and importance.

It is the object of the invention to overcome these difficulties and to render the helicopter largely independent of these ground formation of the take-off or landing ground.

The invention consists in that the legs of a helicopter undercarriage yield substantially without force to a pressure from below until all the legs are in contact with the ground. Then any further movement of the legs is prevented insofar as the helicopter is not already stable in this position. It is immaterial how many legs the undercarriage comprises. As a result of this construction, the effect is obtained that the helicopter does not have to undergo any inclination of the fuselage during take-off and landing as a result of the nature of the ground. After landing, it stands on the ground at the same angle as it previously was when hovering. Here, the permissible inclination of the landing area is limited only by the mobility of the landing gear. It is therefore possible to design the landing gear for a terrain which borders on the limit statically permissible for parking a helicopter.

It makes no difference to the invention whether the landing gear is equipped with wheels, skids or any other supporting members.

In one embodiment of the invention, the movement of the landing legs takes place in guides. The beginning of this movement closes a circuit which actuates brakes for interrupting the movement in the legs so that the movement of all the legs is braked the moment the last leg begins to move.

A further example of the invention is represented by the embodiment wherein the movement of the legs in conducted on a hydraulic system. Each leg is in communication with a piston which, when the helicopter lands on the ground, supplies a liquid from a compartment above the piston to a compartment below the piston. When the last leg has settled on the ground, the movement of the liquid at all the pistons is prevented so that the undercarriage legs are locked in their existing position.

According to another embodiment of the subject of the invention, the adjusting movement of the undercarriage legs is effected by a servo system. In an embodiment similar to that last described, liquid is forced, by a pump, through a control means actuated by the leg in question, against the piston of the leg to be retracted, from below. The power for the retraction is therefore supplied by the pump and so does not affect the position of the fuselage of the helicopter.

Other features are disclosed in the examples of embodiments described below with reference to the accompanying drawings, in which:

FIGS. 1 and 2 show a helicopter, the wheels of which adapt themselves to the uneven ground by unequal retraction;

FIG. 3 shows diagrammatically a strut of an undercarriage as shown in FIG. 2, with an electric circuit for locking the system;

Figure 4:
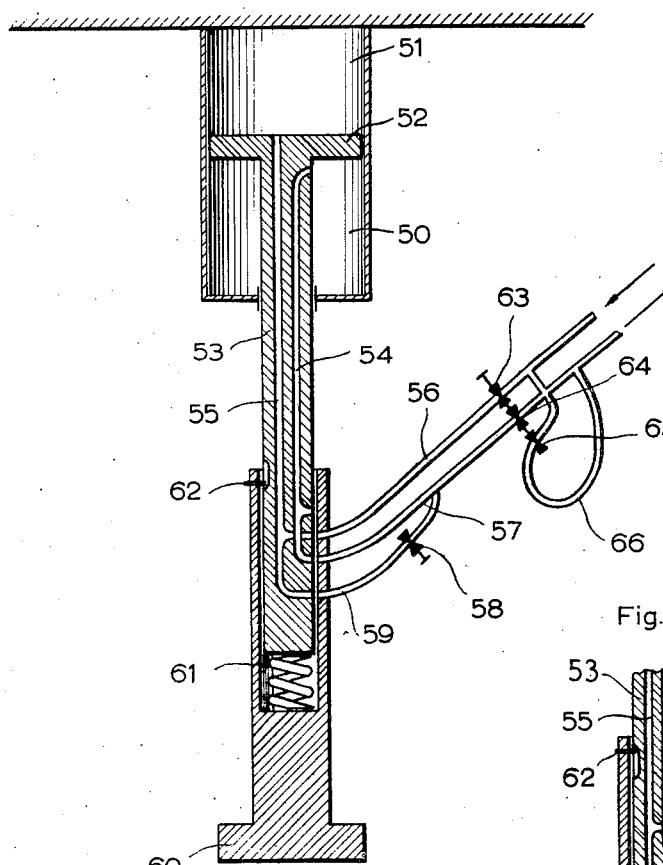
FIGS. 4 and 4a show a leg which is connected to a hydraulic system and retracted by servo force, in section.

The undercarriage struts 22, 23, 24 shown in FIGS. 1 and 2, are mounted on the helicopter 21 in guides. On landing, they yield individually to the pressure of the ground so that the landing gear adapts itself entirely to the irregularities in the ground without the fuselage of the helicopter being inclined. The beginning of the retraction of the last strut locks the movement of all three struts simultaneously, as a result of which subsequent movement of the fuselage is prevented.

The undercarriage strut 31 shown in FIG. 3 is mounted for sliding in the cylinder 30, which is built into the fuselage, and the piston 32 separates the upper cylinder compartment 33 from the lower one 34. The two cylinder compartments 33 and 34 are in communication with one another through the pipe 35 and the valve 36. The undercarriage struts 28 and 29 are likewise suspended and are in communication with the valves 37 and 38 in the same manner. On landing on the ground, the first leg, for example 31, is first displaced upwards, so that the piston 32 delivers liquid from the compartment 33, through the pipe 35 and through the open valve 36 to the compartment 34. At the same time, the contact 39 is closed. As soon as the other struts 28, 29 move, the contacts 40, 41 are closed. As a result of the closing of the last contact, the circuit is closed, so that the magnets 42, 43 and 44 are simultaneously connected to the source of current 48 and the valves 36, 37, 38 close at all the cylinders. As a result, the communication between the upper cylinder compartment 33 and the lower one 34 is interrupted in each case and all the pistons 32 are locked in their existing positions.

For lowering again, after taking off, the pole-reversing switch 49 is thrown. As a result, the switches 42, 43, 44 are conversely connected to the supply and the valves 36, 37, 38 are opened. The legs 31, 28, 29 return to their fully extended position under their own weight and the contacts 39, 40, 41 are opened again.

After this, the switch 49 must be moved back into the landing position.

This circuit is not restricted to the number of undercarriage legs. Any desired number of switches 39, 40, 41 and any desired number of control magnets 42, 43, 44 may be provided in a circuit.

In the embodiment shown in FIG. 4, the piston 52 with the piston rod 53 slides in the cylinder 50, 51 rigidly built into the fuselage. The passage 54 in the interior of the piston rod 53 is in communication with the compartment 50 below the piston and the passage 55 is in communication with the compartment 51 above the piston. The lower portion of the piston rod 53 forms with the upper portion of the undercarriage leg 60 a distributing slide valve which is subject to the pressure of the helical spring 61. The connection is secured against sliding apart and against twisting by a pin 62 which slides in a recess in the rod 53. Connected to three lateral bores in the leg 60 are pipes, of which the pipe 56 is in communication through the valve 58 with a pump, while the pipe 59 leads through the valve 58 into the pipe 57 which leads back, through the valve 64, to the liquid reservoir.

Figure 4A:
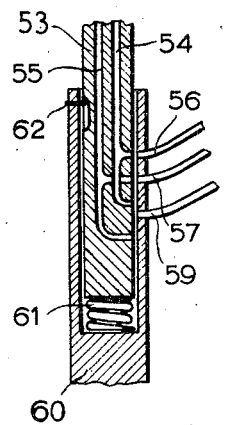

When the helicopter lands, the distributing slide valve is moved in the following manner:

As soon as the leg 60 touches the ground, it is displaced upwards against the force of the spring 61 until the pipe 56 comes into communication with the passage 54 in the piston rod 53 as shown in FIG. 4a. Through this connection, the liquid is forced by the pump into the cylinder compartment 50 below the piston 52 so that the latter moves upwards and the leg is retracted, while the liquid escapes from the compartment 51 above the piston 52 through the conduits 55 and 57. When the pressure on the leg 60 ceases, the position shown in FIG. 4 is re-established by the spring 61 and the weight of the leg 60. The communication between the conduits 54 and 56 is interrupted and the liquid from the pipe 56 flows through the lower portion of the passage 55 through the pipe 59 and the open valve 58 into the pipe 57 and from there to the liquid reservoir. When the last leg receives pressure from below, the coupled valves 63, 64 are closed and 65 opened at all the cylinders through an electric circuit similar to FIG. 3 but not illustrated here. As a result, all movement in the cylinder is interrupted and the piston and hence the leg is locked in its existing position. The delivery of the pump, which continues to run, is effected through the pipe 66 with the now open valve 65.

The re-extension of the legs under pressure without contact with the ground is effected as a result of the fact that with valves 63 and 64 open, the valve 58 is closed at will, so that the liquid flows out of the pipe 56, through the passage 55 into the compartment 51, while the liquid from the compartment 50 escapes through the passage 54 and the pipe 57. The piston 52 is thus urged downwards and the leg is extended.

I claim:

A vertical take-off and landing aircraft including a fuselage and at least three legs arranged to support the fuselage on the ground, each of said legs including a cylinder rigidly attached to said fuselage, a piston rod extending out through the lower end of said cylinder and having a ground engaging member on the lower end thereof, a piston on the upper end of said piston rod within said cylinder in sealed relation thereto, liquid filling said cylinder above and below said piston, a liquid bypass line extending between opposite end portions of said cylinder for the flow of liquid around said piston to permit movement of said piston relative to said cylinder, an electrically operated valve in said bypass line for closing said bypass line to prevent movement of said piston relative to said cylinder, a switch actuated by upward movement of said piston rod, the switches of said legs being connected in series as part of an electrical circuit, said electrical circuit being connected to said valves whereby when all of said switches are closed said valves are closed to prevent further upward movement of said piston rod, and means for manually effecting the opening of said valves to permit said piston and piston rods to return to lowered positions by gravitational forces.

References Cited in the file of this patent
UNITED STATES PATENTS

| | | |
|---|---|---|
| 2,630,989 | Sikorsky | Mar. 10, 1953 |
| 2,927,747 | Bennie | Mar. 8, 1960 |

OTHER REFERENCES

Flight, December 18, 1953, page 815.